United States Patent [19]

Koser

[11] Patent Number: 4,462,782
[45] Date of Patent: Jul. 31, 1984

[54] INJECTION SLEEVE MOLDING MACHINE

[75] Inventor: Charles W. Koser, Syracuse, Ind.

[73] Assignee: T & M Rubber, Inc., Goshen, Ind.

[21] Appl. No.: 439,796

[22] Filed: Nov. 8, 1982

[51] Int. Cl.³ .............................................. B29D 23/02
[52] U.S. Cl. .................................... 425/183; 425/185;
425/186; 425/577; 264/538
[58] Field of Search .............. 425/183, 185, 186, 577,
425/356; 264/297.2, 328.8, 328.1, 538

[56] References Cited

U.S. PATENT DOCUMENTS

| | | | |
|---|---|---|---|
| 3,550,209 | 12/1970 | Carpenter | 425/577 X |
| 3,776,991 | 12/1973 | Marcus | 264/538 X |
| 4,076,484 | 2/1978 | Armour | 425/533 X |
| 4,243,362 | 1/1981 | Rees | 425/183 X |

Primary Examiner—Donald E. Czaja
Assistant Examiner—V. Fischbach
Attorney, Agent, or Firm—Marmaduke A. Hobbs

[57] ABSTRACT

An injection sleeve molding machine having a rubber injection section and a sleeve molding section, in which the sleeve molding section includes a barrel with a mold cavity for receiving uncured rubber material, and two mandrels having a forward and rearward end inserted axially and alternately into the cavity of the barrel for a molding operation. The rear end of the mandrels are mounted on a pivoted member on a carriage which travels parallel to the axis of the mandrels for inserting the mandrels in the cavity of the barrel. When the molding operation has been completed, the carriage withdraws the mandrel from the cavity, and the pivoted member for the mandrels is rotated angularly to place a mandrel in position for insertion in the cavity. When it has been inserted in the cavity, the second injection operation is performed and, while that second operation is being performed, the previously formed molded sleeve is stripped from the first mandrel, thus preparing it for the next succeeding molding operation.

27 Claims, 8 Drawing Figures

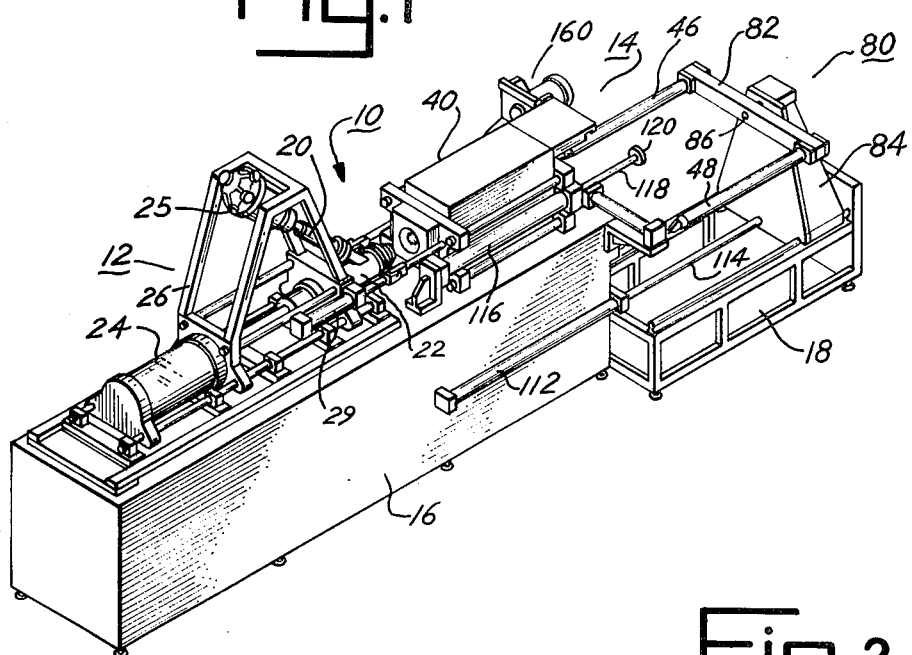
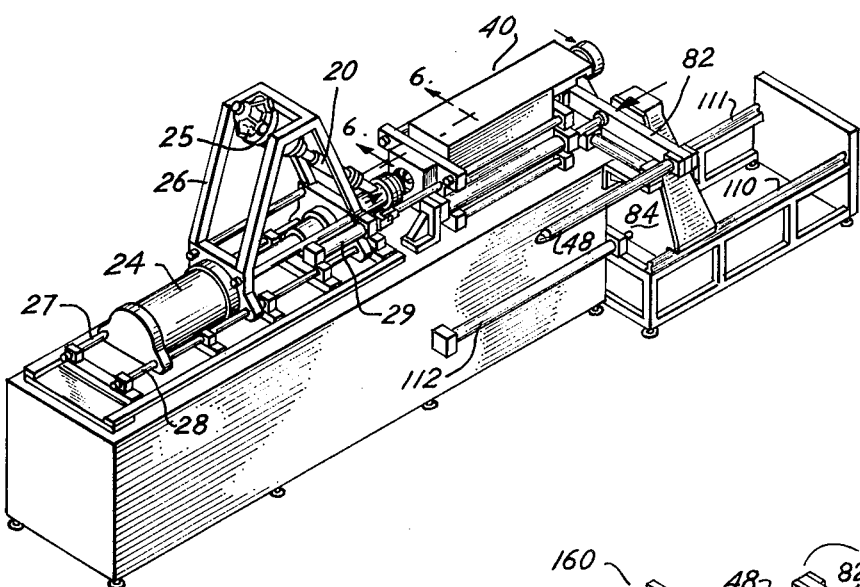
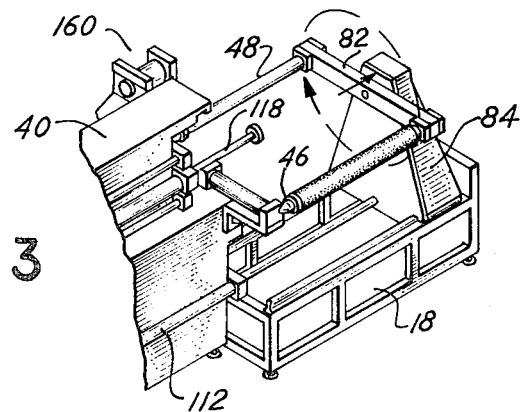

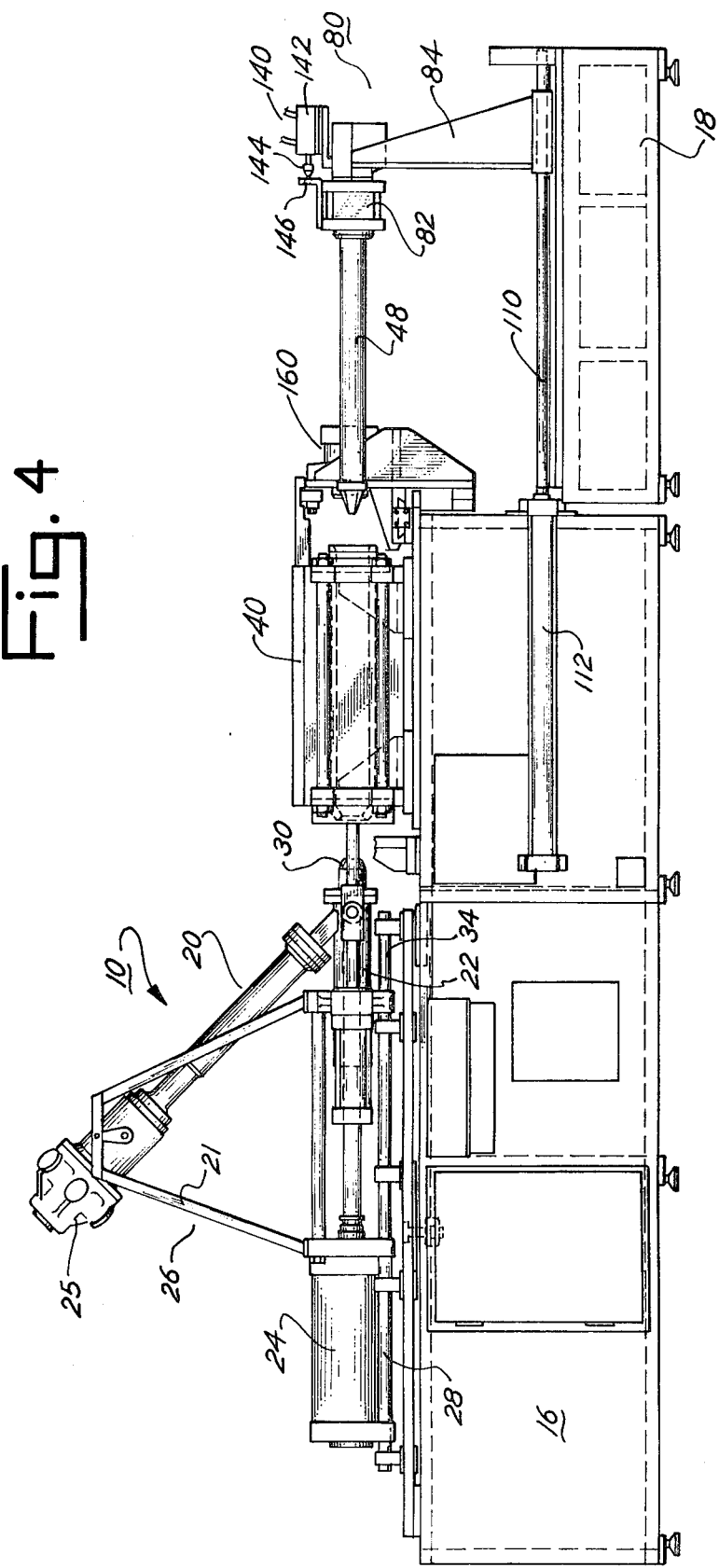

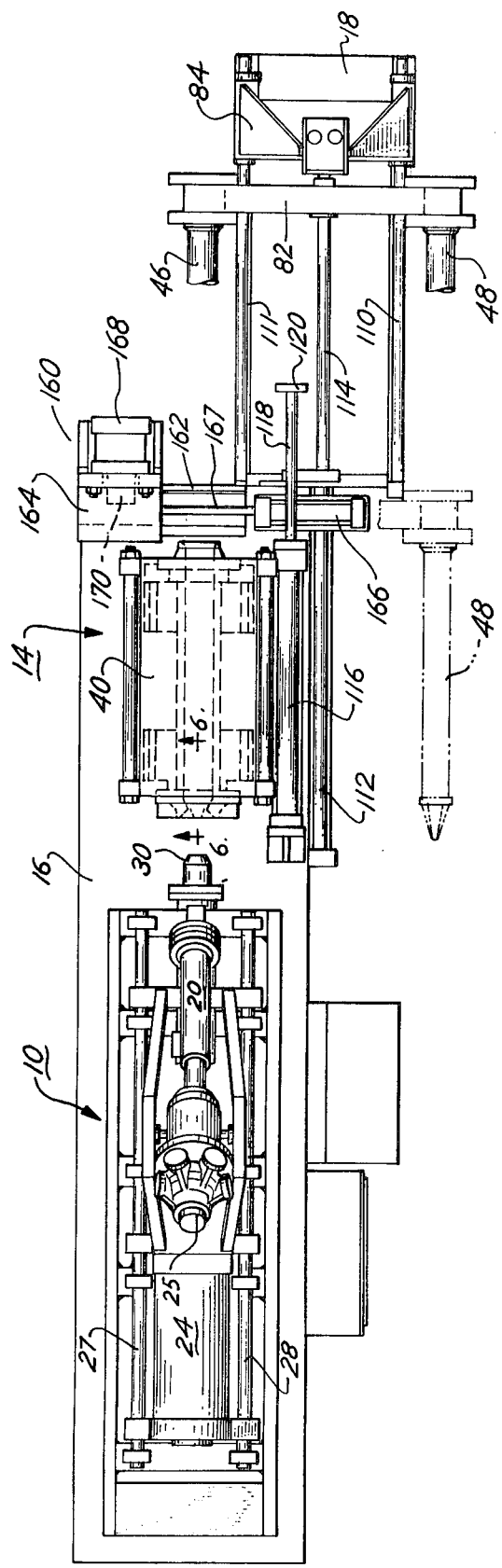

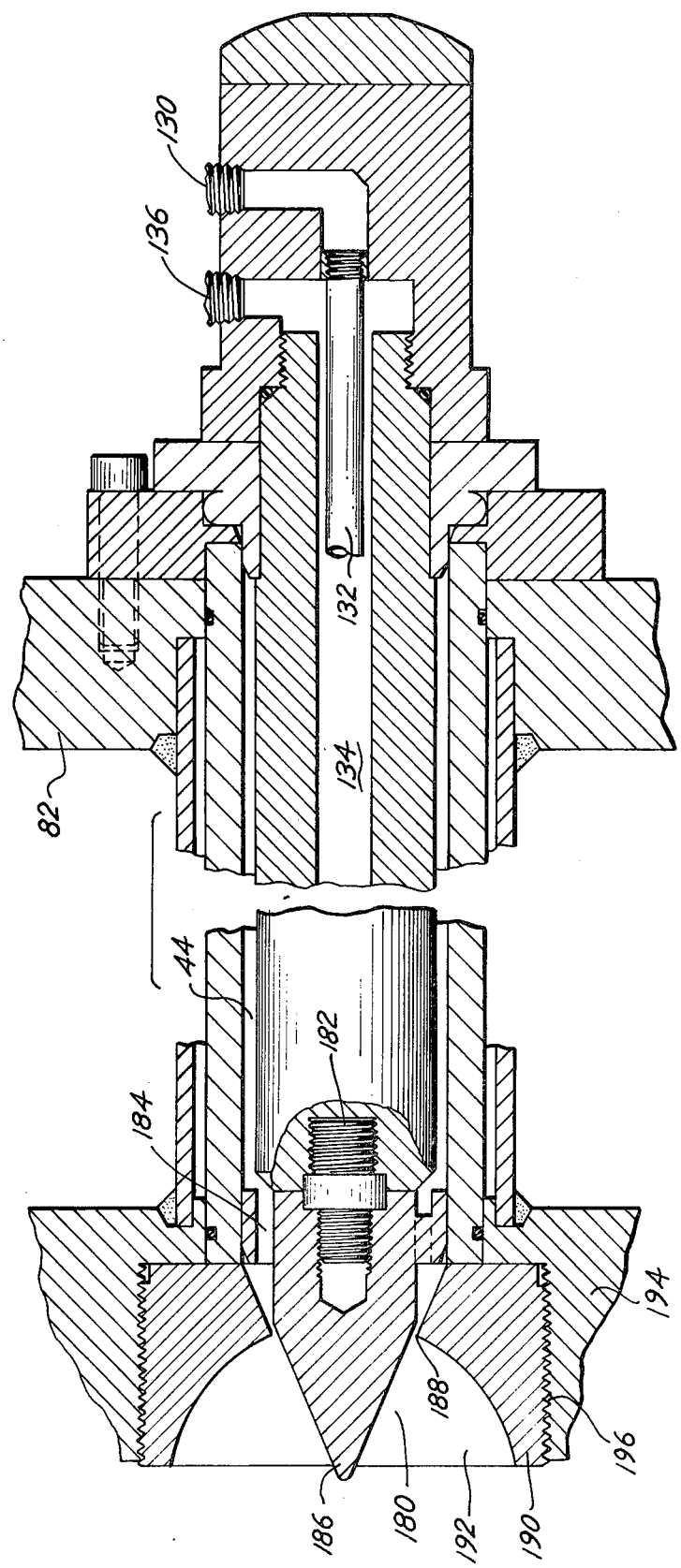

INJECTION SLEEVE MOLDING MACHINE

BACKGROUND OF THE INVENTION

In the conventional procedure and machine for producing rubber gaskets, seals and the like, uncured rubber material is fed into an extruder wherein an auger propels the material to and through a die which forms a sleeve or tube of the desired length, usually two or three feet in length, before it is severed from the die. The rubber material is heated either before the material is introduced into the extruder and/or while it is in the extruder, to the temperature required to plasticize the material so that it will conform to the die and form the tubular extrusion. The extruded sleeve, which is normally quite flexible, is cooled and a first mandrel is inserted in the sleeve for curing and sizing of the sleeve. The sleeve is then removed from the first mandrel and a second mandrel is inserted in the sleeve and the external surface of the sleeve is ground to the desired external dimension, after which a third mandrel is inserted in the sleeve, and the mandrel and sleeve are inserted in a lathe where the rubber sleeve is cut into rings for gaskets, seals and the like by a knife or other tool moved radially inwardly while the mandrel and sleeve are rotating in the lathe. This conventional method of producing the rings requires three separate handling operations in which the three mandrels are inserted in each individual sleeve. These operations require a substantial amount of labor and time to complete the full procedure from the extruding step to the final step in which the severed rings are removed from the third mandrel.

SUMMARY OF THE INVENTION

It is one of the principal objects of the present invention to provide a rubber injection sleeve molding machine and method which eliminates two of the three mandrel insertion operations and separate curing and external sizing operations, and in which the step of removing the molded sleeve from the mandrel is performed while the next sleeve is being molded.

Another object of the invention is to provide a machine for molding rubber sleeves, which forms the sleeves with the final dimensions and permits the molded rubber to cure before it is removed from the machine mold, and which has a plurality of sleeve mandrels which are rotated between stations to permit one sleeve to be molded while a previously molded sleeve is being removed from the mandrel.

The foregoing objects, and other objects and advantages which will become apparent from the following description and accompanying drawings, are accomplished by an injection sleeve molding machine in which a mandrel is inserted into a cylindrically shaped mold cavity for forming a sleeve. The cavity is disposed in a barrel-like body having a heating means for curing the rubber injected into the cavity, and a turret mechanism is used for supporting and for revolving two or more mandrels from a mold insertion position to a molded sleeve removal position. The molding operation is performed simultaneously with the removal of the molded sleeve from the mandrel used in the preceding molding operation.

More specifically, the machine and method include or involve a heated barrel and two mandrels, with the two mandrels being mounted on a revolving member supported on a carriage which slides on a track on the base of the machine. When the machine is in operation, the carriage carrying the two mandrels advances, moving one of the mandrels into the cavity of the heated barrel, and after it has been fully inserted in the barrel, a heated cylinder containing the uncured heated rubber is advanced and seated on the end of the mandrel and against the end of the barrel. A ram cylinder is moved inwardly in from the side and seated on the rear end of the revolving carriage member, holding the mandrel in place in the mold cavity to counteract the pressure exerted by the seating of the heated cylinder containing the rubber on the barrel. The rubber is then injected into the mold cavity onto the mandrel by a piston in the heated cylinder. While the rubber is curing in the barrel, the rubber sleeve on the other mandrel is removed by injecting air between the mandrel and the sleeve, thereby loosening the sleeve and permitting it to easily be slipped from the mandrel. After the rubber has cured on the mandrel in the barrel, the ram is withdrawn and the carriage and mandrels are retracted. While the mandrels are being retracted, a centering unit engages the revolving member on the carriage to hold the mandrels in a fixed angular position until the carriage is fully withdrawn, at which time the mandrels and supporting member are revolved in a 180° arc to place the mandrel with the rubber sleeve to the side of the machine for the sleeve stripping operation, and the stripped mandrel into position for entry into the barrel for repeating the aforementioned procedure. The machine and method eliminate the separate basic step of the operation of the conventional method of first extruding the material, curing the mold sleeve and sizing the sleeve, before the tube is cut into gaskets or seals. In the specification and claims, the terms "rubber", "uncured rubber" and "cured rubber" are used in a generic sense to refer to and include any elastomeric material, either synthetic or natural, which can be molded in the present machine and/or by the present method.

BRIEF DESCRIPTION OF THE DRAWINGS

FIG. 1 is a perspective view of an injection sleeve molding machine embodying the present invention, illustrating the machine in one operating position;

FIG. 2 is a perspective view of the machine shown in FIG. 1, illustrating the machine in another operating position;

FIG. 3 is a fragmentary perspective view of the machine shown in FIGS. 1 and 2, illustrating one step in the operation of the machine;

FIG. 4 is a side elevational view of the machine shown in the preceding figures;

FIG. 5 is a top plan view of the machine shown in the preceding figures;

FIG. 8 is a cross sectional view of the barrel and mandrel, illustrating a modified form of the barrel and mandrel, together with a portion of the carriage and heating system for the mandrels.

DESCRIPTION OF THE PREFERRED EMBODIMENT

Figure 6:
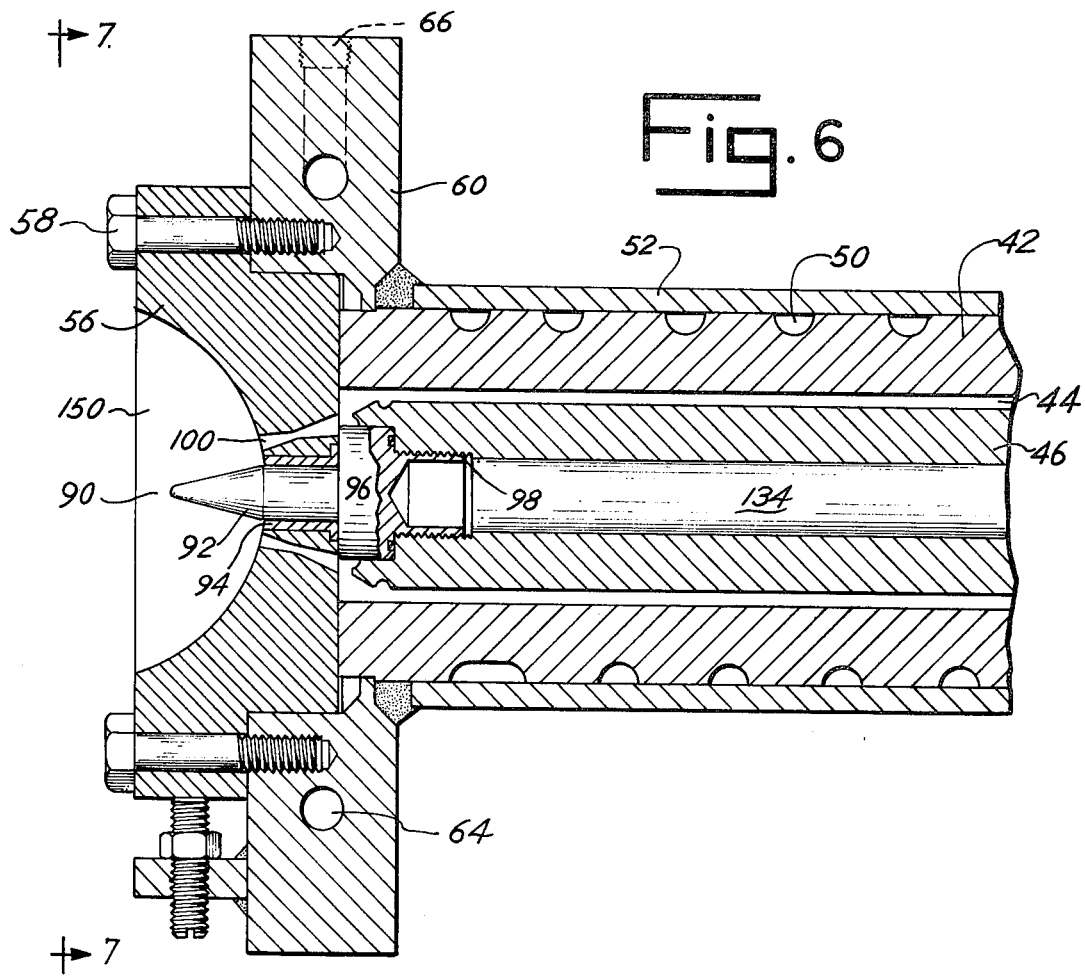
FIG. 6 is an enlarged cross sectional view of a portion of the machine, showing a portion of the barrel and mandrel used in the machine, the section being taken essentially on line 6—6 of FIG. 2.
Figure 7:
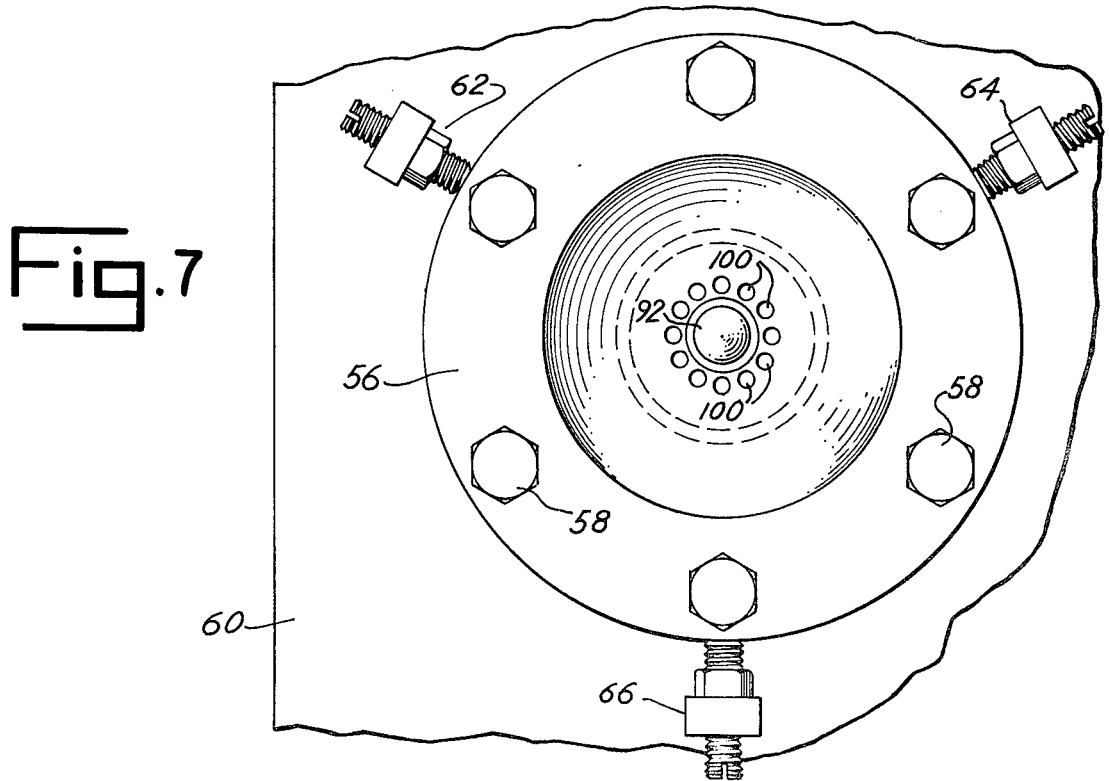
FIG. 7 is an end elevational view of a part of the barrel of the machine illustrated in FIG. 6.

Referring more specifically to the drawings, and to FIG. 1 in particular, numeral 10 indicates generally an injection sleeve molding machine having an injection section 12 and a molding section 14, the injection section being mounted on a base 16 and the molding section being partially mounted on base 16 and on a bed 18.

The injection section, which, for the purpose of the present invention, is considered conventional in construction and operation, has an auger assembly 20 and a cylinder and piston injection section 22 operated by a hydraulic cylinder 24 through a piston rod. The auger assembly is driven by a motor 25 and uncured rubber is propelled by the auger (not shown) in the auger assembly into the forward end of cylinder 22 and is ejected therefrom into the molding section by the operation of hydraulic cylinder 24. In the injection section 12, auger assembly 20 and cylinders 22 and 24 are connected to a frame 26 and are advanced on tracks 27 and 28 to and from the molding assembly by a hydraulic cylinder 29. The forward end of cylinder 22 forms a nozzle 30 which has a contour for seating on the molding section and forming an effective seal therewith during the injection step of the operation of the machine. Operation of hydraulic cylinder 24 ejects the uncured rubber from cylinder 22 into the cavity of the molding section. Thereafter, the cylinder withdraws the piston in cylinder 22, permitting the auger to recharge the cylinder for the next succeeding injection operation. Further details of the injection section are not required herein to fully understand the present invention.

The molding section 14 has a barrel assembly 40, shown in partial cross section in FIG. 6, the barrel 42 thereof having a mold cavity 44 for receiving either of the two mandrels 46 or 48. The barrel is heated by a fluid in annular or helical passages 50 disposed around the outer surface of barrel 42 and enclosed by a sleeve jacket 52; thus, the barrel is provided with sufficient heat to cure the rubber injected into the cavity during the operation of the mold while mandrel 46 is seated on the forward end plate 56 of the barrel, the plate being secured to the barrel body by a plurality of bolts 58 extending through the plate into a flange 60 at the forward end of the barrel. The plate can be accurately adjusted on the end of the barrel by a plurality of adjustment screw assemblies 62, 64 and 66 secured to flange 60 and abutting against the periphery of plate 56. The flange is preferably heated by hot fluid circulating through an annular passage 64 connected to a source of fluid by inlet passage 66.

The mandrels 46 and 48 are supported on a carriage 80 at opposite ends of a revolving bar or member 82 pivotally connected to the body 84 of the carriage by a shaft or pin 86, the two mandrels projecting forwardly from said bar in parallel relation to cavity 44 of the barrel. Each of the mandrels 46 or 48 has a tip assembly 90 disposed on the forward end and having a tapered pin 92 for extending through an opening 94 in the center of plate 56, thereby permitting the base 96 of the tip to seat firmly on the inner side of plate 56. The tip assembly is secured to the respective mandrels by a threaded portion 98 in the forward end of the mandrels. When the mandrel is in place in the barrel and cylinder 22 has been advanced to seat the forward end on plate 56, the cavity 44 for forming the sleeve is connected to cylinder 22 of the injection section by a plurality of holes 100 spaced around the periphery of pin 92.

Carriage 80 is mounted on a pair of tracks 110 and 111 on opposite sides of bed 18 and is adapted to move from an inoperable position shown in FIG. 1 to the molding position shown in FIG. 2. The carriage 80 is moved on tracks 110 and 111 by a hydraulic cylinder 112 having a rod 114 connected to carriage body 84 for moving the carriage assembly between the two aforementioned positions. A booster cylinder 116 is preferably included for initially moving the carriage from the position in which the molding operation is performed, the cylinder having a rod 118 with a pusher head 120 thereon for engaging the bar member 82 near the center portion thereof. The two hydraulic cylinders 112 and 116 are operated by a hydraulic system including lines thereto (not shown) controlled by the operator. The hydraulic system, as such, is not illustrated in the drawings since it is considered conventional and uses standard components.

The carriage 80 operates, in effect, as a turret to place the two mandrels in operating position for molding the sleeves on one mandrel while the other mandrel is being stripped of a molded sleeve. This operation is illustrated in FIG. 3 wherein bar 82 is rotated on pivot 86 to move the mandrel with the molded sleeve thereon to the side of the machine and to place the stripped mandrel into the position required for inserting it in cavity 44 of barrel 42. The two mandrels are secured to the ends of bar member 82 in such a manner that they can slide slightly with respect to the bar member to permit self-centering of the mandrels in the mold cavity, and they are firmly supported by the bar member for movement in the 180° arc illustrated in FIG. 3. The mandrels are heated by a hot fluid introduced into each mandrel through inlet conduit 130 and pipe 132 extending a substantial distance through a center bore 134 of each mandrel for discharging the heated fluid near the forward end of the mandrels. The heated fluid then flows along the outer side of conduit 132 in bore 134 to return outlet line 136. Both mandrels 46 and 48 are provided with similar connections to a fluid heating system, and the conduits or tubes for delivering the heated fluid to the two mandrels may be interconnected to one another and to a common source.

A centering mechanism for the mandrel and bar assembly is indicated by numeral 140 and consists of a hydraulic cylinder 142 with a plunger 144 thereon for engaging a bracket 146 on member 82 and seating in a recess therein. When the plunger is extended by the pressure of the hydraulic fluid in cylinder 142, the plunger seats in the recess in bracket 146 and holds the mandrels in a fixed angular position with the bar member in horizontal position, while the carriage is being moved from left to right, as viewed in FIG. 1, wherein the mandrel in the barrel is withdrawn from the barrel, to the position illustrated in FIGS. 1, 3, 4 and 5. After the carriage has been moved fully to the right and the mandrel has just been withdrawn from the barrel, the plunger 144 of cylinder 142 is withdrawn from its recess in bracket 146, thereby permitting the bar member to swing angularly and move the mandrel with the newly formed sleeve thereon from the position at the entrance of the barrel to the lateral position along the side of the machine. The operation of inserting the mandrel in the barrel is then repeated for the next successive molding operation.

As the mandrel, either 46 or 48, is inserted in cavity 44 of the barrel and approaches the forward end thereof, the tapered end 92 seats in the center hole 94 in plate 56 and, when the mandrel has been moved to its fully operational position, the forward face of the tip base 96 seats on the inner face of plate 56. When this operation has been completed and cylinder 22 has been advanced to seat in the recess 150 of plate 56, heated uncured rubber is injected through holes 100 into the cavity 44 between the mandrel and the inner surface of the barrel.

Since a substantial amount of force is applied to the mandrel during the injecting operation, a ram is preferably included in the machine to hold the mandrel firmly in place. The ram assembly is best shown in FIG. 5 and is identified by numeral 160, consisting of a track 162 and a moveable base 164, which is shifted by hydraulic cylinder 166 from the position shown in FIG. 5 to the position where the ram base 164 is directly behind the mandrel in the barrel and adjacent the respective end of bar member 82. A second hydraulic cylinder 168, which is now in alignment with the mandrel in the cavity in the barrel, is actuated to force the plunger or ram element 170 firmly against the rear side of arm 82, thereby firmly holding the mandrel in place in the mold cavity.

In the use and operation of the embodiment of the invention just described, starting with the machine in the position illustrated in FIGS. 1, 3 and 4, the main cylinder 112 is operated to move carriage assembly 80 from the right hand position to the position wherein mandrel 46, for example, is inserted in cavity 44 of barrel 42, while bar member 82 and mandrels 46 and 48 are held in a fixed angular position by hydraulic cylinder 142 and plunger 144. After the mandrel is fully seated in the barrel, cylinder 166 is actuated to place the ram behind the mandrel, and plunger 170 is moved into firm engagement with the bar member to hold the mandrel in place in the mold cavity. The unit of the injection section consisting of auger assembly 20, cylinders 22 and 24, and frame 25 is then moved bodily from the withdrawn position at the left to the operating position at the right by hydraulic cylinder 29. In this operating position, the end of cylinder 22 is in engagement with plate 56 and nozzle 30 is seated firmly in recess 150 in the plate. The heated uncured rubber is then injected from the end of cylinder 22 through holes 100 into cavity 44 to form an elongated sleeve extending substantially the full length of the barrel and mandrel therein. After sufficient time has elapsed to permit curing of the rubber in the cavity, the unit including cylinder 22 is withdrawn to the left to its original position by cylinder 29, and, after the ram assembly has been removed from its holding position behind the mandrel in the barrel, the main cylinder 112 and auxiliary cylinder 116 are actuated to move carriage assembly 80 to the left, thereby withdrawing mandrel 46 from cavity 44 while the bar member 82 and mandrels 46 and 48 are held in a fixed angular position by plunger 144. When the carriage has been moved part of the way to the left the auxiliary cylinder ceases to perform any function and the main cylinder proceeds to move the carriage fully to the right as viewed in FIGS. 1-5. When the carriage has been returned to its fully withdrawn position, plunger 144 releases bar member 82, thereby permitting the member to rotate on pivot 86 and move the mandrel 46 from the position illustrated in FIG. 1 to the alternate position shown in FIG. 3. The aforementioned molding operation is now ready to again be performed. While the second molding operation is being performed, the sleeve on mandrel 46 is removed by the operator, normally by injecting air beneath the sleeve to loosen it from the mandrel and slipping the sleeve axially from the end of the mandrel, the mandrel thereby being stripped clean and ready for the next succeeding molding operation to be performed in the steps as just described.

In a modified form of the mandrel, the tip assembly 180 is secured to the mandrel by threaded element 182 and is provided with a plurality of holes 184 spaced around the periphery of the tip assembly through which the heated uncured rubber is injected into the cavity 44 of the barrel. The tip 186 extends through an opening 188 in modified plate 190 which has a recess 192 for receiving nozzle 30 of cylinder 22 from which the rubber is transferred to the mold cavity. Plate 190 is secured in place in flange 194 by screw threaded portion 196. The barrel and mandrel and the operation of the machine are otherwise essentially the same as described hereinbefore.

While only one embodiment and one modification of the present machine have been described herein, various changes and modifications may be made without departing from the scope of the invention.

I claim:

1. An injection sleeve molding machine comprising a rubber injection section, and a sleeve molding section, said injection section having an auger and an injection cylinder for receiving uncured rubber material from said auger and for injecting the material into the molding section, said sleeve molding section including an elongated barrel having fixed forward and rearward end sections and a mold cavity for receiving uncured material from the cylinder of said injection section, two spaced elongated mandrels having a forward end and a rearward end for insertion axially into the cavity of said barrel, a centering means on said mandrels at said forward and rearward ends engaging said end sections for centering and holding said mandrels in centered position in said cavity during the molding operation, a pivoted member connected to said mandrels at their rearward end, a carriage for moving said mandrels into and from the cavity in said barrel, pivot means for rotating said pivoted member to shift said mandrels between a position for insertion into said cavity and a position remote therefrom for stripping molded sleeves from the mandrels, and means for moving said carriage, pivoted member and mandrels toward and away from said barrel.

2. An injection sleeve molding machine as defined in claim 1 in which said mandrels are parallel to one another and said pivot means for said member is located near the center thereof for rotation of said member through a 180° arc for alternately placing one mandrel and then the other in position for insertion in the cavity of the mold.

3. An injection sleeve molding machine as defined in claim 2 in which a means holds said pivoted member in a fixed angular position while the carriage is moved toward and away from said barrel.

4. An injection sleeve molding machine as defined in claim 3 in which said carriage is mounted on a bed having tracks extending parallel with the mandrels, and a hydraulic cylinder moves said carriage on said tracks toward and away from said barrel.

5. An injection sleeve molding machine as defined in claim 1 in which said barrel has a forward end plate with a center hole therein and a plurality of holes arranged around said center hole and communicating with the cavity, and said mandrels form cores for said cavity and each has a tip for seating in the center hole of said plate.

6. An injection sleeve molding machine as defined in claim 1 in which the barrel has an end plate with a center hole, each mandrel has a tip for seating in said hole, and said tips have holes extending therethrough for receiving uncured material and transmitting it to the mold cavity of said mandrel.

7. An injection sleeve molding machine as defined in claim 1 in which a heating means is provided for said barrel and mandrels for facilitating curing of the rubber material.

8. An injection sleeve molding machine as defined in claim 1 in which said cavity is of an elongated cylindrical shape, and said mandrels are cylindrical shaped and are centered in said cavity when inserted therein in the molding operation.

9. In an injection sleeve molding machine having an injection section and a sleeve molding section, said sleeve molding section having a barrel with fixed forward and rearward end sections and with an elongated cavity and openings at each end of the cavity, a pair of elongated mandrels arranged in parallel spaced relation to one another, each mandrel having a forward end, a rearward end, and a centering means at said forward and rearward ends engaging said end sections for centering and holding said mandrels in centered position in said cavity during the molding operation, a carriage at one end of said barrel with a member thereon for supporting said mandrels at one end thereof, power means for moving said carriage toward and away from said one end of said barrel and moving therewith one or the other of said mandrels into and from the cavity in said barrel for performing a molding operation, and means for moving said member with the mandrels for alternately placing said mandrels in positions for insertion into said cavity and for removal of a molded sleeve from a mandrel.

10. In an injection sleeve molding machine as defined in claim 9 in which said mandrels are parallel with one another and a pivot means for said member is located near the center thereof for mounting said member on said carriage for rotation through 180°, for alternately placing one mandrel and then the other in position for insertion in the cavity of the mold.

11. In an injection sleeve molding machine as defined in claim 10 in which a means holds said pivoted member in a fixed angular position while the carriage is moved toward and away from said barrel.

12. In an injection sleeve molding machine as defined in claim 9 in which said carriage is mounted on a bed having tracks extending parallel with the mandrels, and a hydraulic cylinder moves said carriage on said tracks toward and away from said barrel.

13. In an injection sleeve molding machine as defined in claim 9 in which said barrel has a forward end plate with a center hole therein and a plurality of holes arranged around said center hole and communicating with the cavity, and said mandrels form cores for said cavity and each of said centering means has a tip for seating in the center hole of said plate.

14. In an injection sleeve molding machine as defined in claim 9 in which the barrel has an end plate with a center hole, said centering means of each mandrel has a tip for seating in said hole, and said tips have holes extending therethrough for receiving uncured material and transmitting it to the mold cavity externally of said mandrel.

15. In an injection sleeve molding machine as defined in claim 9 in which a heating means is provided for said barrel and mandrel for facilitating curing of the rubber material.

16. In an injection sleeve molding machine as defined in claim 9 in which said cavity is of an elongated cylindrical shape, and said mandrels are cylindrical shaped and are centered in said cavity when inserted therein in the molding operation.

17. In a sleeve molding machine, an injection mold comprising a barrel having fixed forward and rearward end sections and a cavity, said forward end section including an end plate with a center hole and a plurality of holes arranged around said center hole and communicating with said cavity, and a mandrel forming a core for said cavity and having a centering means at the forward and rearward ends thereof engaging said end sections for centering and holding said mandrel in centered position in said cavity during the molding operation, said centering means including a tip seating in said center hole in said end plate.

18. In a sleeve molding machine, an injection mold as defined in claim 17 in which the cavity in said barrel is of an elongated cylindrical shape and the mandrel is of a cylindrical shape and spaced from and centered in said cavity.

19. In a sleeve molding machine, an injection mold as defined in claim 17 in which an annular groove is disposed in said mandrel near the tip thereof for assisting in removing the molded sleeve along with said mandrel from the cavity.

20. In a sleeve molding machine, an injection mold as defined in claim 17 in which a heating means is provided in said barrel and in said mandrel for maintaining an elevated temperature to facilitate curing of the rubber material injected into said cavity.

21. In a sleeve molding machine, an injection mold comprising a barrel having fixed forward and rearward end sections and a cavity, said forward end section including an end plate with a center hole therein, and a mandrel forming a core for said cavity and having a centering means at the forward and rearward ends thereof engaging said end sections for centering and holding said mandrel in centered position in said cavity during the molding operation, said centering means including a tip seating in said center hole in said end plate and having a plurality of holes therethrough for injection of uncured material into said cavity.

22. In a sleeve molding machine, an injection mold as defined in claim 21 in which the cavity in said barrel is of an elongated cylindrical shape and the mandrel is of a cylindrical shape and spaced from and centered in said cavity.

23. In a sleeve molding machine, an injection mold as defined in claim 21 in which an annular shoulder is disposed near the end of said mandrel for assisting in removing the molded sleeve along with said mandrel from the cavity.

24. In a sleeve molding machine, an injection mold as defined in claim 21 in which a heating means is provided in said barrel and in said mandrel for maintaining an elevated temperature to facilitate curing of the rubber material injected into said cavity.

25. An injection sleeve molding machine as defined in claim 1 in which a ram is disposed laterally from the rear entrance of the cavity and a power means is provided for moving the ram behind the end of the member and respective mandrel after the mandrel has been inserted in the mold in the cavity in preparation for a molding operation.

26. An injection sleeve molding machine as defined in claim 25 in which said ram includes a hydraulic cylinder for firmly holding the mandrel in place in the cavity during the molding operation.

27. An injection sleeve molding machine as defined in claim 9 in which a retractable means is provided for locking the mandrel in the cavity during the molding operation.

* * * * *